United States Patent Office 2,734,860
Patented Feb. 14, 1956

2,734,860

TREATMENT OF WELL-DRILLING FLUID

Delmar H. Larsen, West Hollywood, and George W. Cummer, Los Angeles, Calif., and Don S. Bolley, Brooklyn, N. Y., assignors to National Lead Company, New York, N. Y., a corporation of New Jersey No Drawing. Application July 14, 1948,
Serial No. 38,758

8 Claims. (Cl. 252—8.5)

This invention relates to well-drilling fluids particularly as employed in the drilling of oil and gas wells by the rotary system of drilling.

In the drilling of wells, particularly by the rotary system of drilling, an aqueous drilling fluid is employed in which the solid phase is a drilling clay. In order to control the viscosity and thixotropic properties, and particularly in order to improve the water loss, a concentrated colloidal clay, such as a swelling bentonite of the Wyoming-South Dakota type, is employed. Where salt water is present in the fluid or encountered during drilling, it has been the practice to employ a clay in the form of a fuller's earth of the Georgia-Florida type. While such a fuller's earth imparts viscosity characteristics to the fluid, its water loss is rather high. A low water loss may, however, be obtained by the employment of gelatinized starch.

One of the objects of this invention is to provide a well-drilling fluid which will have good gel-forming characteristics and low water loss.

Another object is to provide a composition for the treatment of well-drilling fluid.

Further objects will appear from the detail description, in which will be set forth a number of embodiments; it is to be understood, however, that this invention is susceptible of various embodiments within the scope of the appended claims without departing from the spirit of this invention.

Generally stated, and in accordance with the illustrative embodiments in this invention, an aqueous clay-laden well-drilling fluid has incorporated therein finely divided linseed hulls, and particularly oil-extracted linseed hulls, that is, in which the oil has been solvent-extracted from the hulls. The linseed hulls may be added to the clay-laden well-drilling fluid in an amount sufficient to improve the water loss substantially. The linseed hulls may, however, be incorporated with the drilling clay in the desired percentage, so that when the clay is added to water or to an aqueous clay-laden drilling fluid, it will attain the desired results. The drilling clay may be native clay; however, it is desirable to incorporate the linseed hulls with a concentrated colloidal clay, such as a swelling bentonite, or with a fuller's earth of the Georgia-Florida type. The invention may be applied to fresh water drilling fluids, as well as to salt water drilling fluids.

Linseed hulls are dispersible in water and swell to form a gel, imparting viscosity as well as thixotropic properties. Such a gel is not flocculated by salts, such as sodium, potassium and calcium chlorides, but such salts decrease the viscosity of a water suspension. Linseed hulls are, therefore, suitable for employment in an aqueous drilling fluid, whether the aqueous phase is fresh or salt water, to improve the viscosity, thixotropic and water-loss characteristics. Such a linseed hull gel is also tolerant to the bacteria, enzymes and other gel-degrading constituents encountered during the course of drilling, so that it is not necessary to employ preservatives. The gel is also tolerant to a range of pH encountered in drilling fluids from low to high.

The linseed hulls are those which have been separated from the kernel. They are preferably solvent-extracted, to remove the oil therefrom, so as to be substantially free from linseed oil because in that way their efficiency is improved. Such linseed hulls are distinguished from linseek cake, because while the latter have a high content of protein, linseed hulls are virtually free of protein. The hulls, after separation from the kernel, are finely ground, as by being subjected to grinding in a ball-mill or in a Raymond mill for about twenty-four hours.

The following shows briefly the effect of the addition of linseed hulls, prepared by grinding and oil extraction as described above, to various drilling fluids:

TABLE I

| Mud | Type | Material Added | Grams Added Per 100 cc. Mud | Water Loss, cc. A. P. I. | Viscosity, Centipoises |
|---|---|---|---|---|---|
| A | Salt | Nothing | | 140 | 5½ |
| A | do | Linseed hulls | 2.5 | 9 | 37 |
| B | do | Nothing | | 120 | 10 |
| B | do | Linseed hulls | 1.5 | 18 | 52 |
| C | Clay | Nothing | | 36 | 8 |
| C | do | Linseed hulls | 1.75 | 10 | 47 |
| D | do | Nothing | | 20½ | 31 |
| D | do | Linseed hulls | 1.1 | 10 | 65 |
| E | High pH | Nothing | | 18 | 5 |
| E | do | Linseed hulls | 1.0 | 8 | 31 |

In the above table, the drilling fluids entitled "Mud" were the following:

A—A saturated salt-water fluid containing five grams per deciliter of a fuller's earth of the Georgia-Florida type, with no pH control, and after 60 hours aging at 150° F.

B—A drilling fluid similar to A, but with the pH maintained at 8.5.

C—A fresh-water fluid containing 33% Ada clay, with no preservative added.

D—A tap water (Los Angeles) containing 3.75% by weight California bentonite, and weighted with barytes to 71 pounds per cubic foot, and with about ⅙ pound per barrel of para-formaldehyde (a preservative) added.

E—A tap water drilling fluid containing 3.75% by weight California bentonite weighted with barytes to 71 pounds per cubic foot, and one pound per barrel sodium hydroxide added to obtain a pH of 12.3.

The above shows the advantage of adding linseed hulls to a clay-laden drilling fluid. In each case, and irrespective of the clay employed, whether a native clay, bentonite, or fuller's earth, the water loss has been improved, and indeed greatly reduced. That is outstandingly true in the case of salt water drilling fluids (A and B), employing fuller's earth whose water loss is notoriously high, and whose function has been particularly to impart viscosity characteristics; however, even here the viscosity has been increased with a decrease in water loss, although not beyond an operable viscosity useful in the employment of drilling fluids.

Another advantage to be noted is that the improvement in water loss has been attained without the necessity of maintaining a high pH or a preservative, This is apparent from a comparison of muds A and B, from a comparison of muds C and D, and from a comparison of muds D and E. This is due to the fact that such linseed hulls are resistant to degradation in a drilling fluid to a much greater extent than is starch. This is a distinct advantage, because the employment of an organic material has usually resulted in fermentation, requiring a preservative or a high pH.

The following table additionally shows the advantageous features of this invention:

TABLE II

| Solids | Water | Percent Solids In Water | Viscosity | Yield [1] | Water Loss |
|---|---|---|---|---|---|
| California bentonite | Distilled | 5.5 | 2.3 | 64 | 14.0 |
| California bentonite plus 1% linseed hulls | do | 5.5 | 5.4 | 79 | 10.7 |
| California bentonite | do | 7.0 | 6.0 | 64 | 10.9 |
| California bentonite plus 1% linseed hulls | do | 7.0 | 16.0 | 79 | 9.6 |
| California bentonite | Tap (simulated) | 5.5 | 10.7 | 90 | 16.0 |
| California bentonite plus 1% linseed hulls | do | 5.5 | 22 | 112 | 13.0 |
| California bentonite | do | 7.0 | 27 | 90 | 12.0 |
| California bentonite plus 1% linseed hulls | do | 7.0 | 52 | 112 | 10.6 |

[1] In barrels of 15 centipoise mud per ton of clay.

The California bentonite, as in muds D and E, was a swelling bentonite, although a low-grade bentonite. The water "Tap (simulated)" was a distilled water in which sufficient of a salt mixture, sodium, calcium, chloride and bicarbonate ions were added to simulate Los Angeles tap water. The linseed hulls were prepared as above, with the oil extracted by a solvent.

The outstanding effects of the addition of linseed hulls to bentonite are apparent from the above. By the addition to bentonite of 1% of linseed hulls, so that the bentonite and linseed hulls were in proportion of 99% and 1.0%, the yield has been increased substantially by this very small percentage addition of the linseed hulls. More over, the water loss has not been reduced, but substantially improved, and with an increase in viscosity, although within permissible limits to enable the employment of the bentonite under practical drilling conditions. This enables the bentonite to be treated in an economical manner, to improve its yield, as well as its water loss, so as to provide an improved well-drilling fluid base.

For convenience the following tables are given, which are the result of practical runs, and included in some of the above brief tables:

TABLE III

Additives in salt water Zeogel mud (no pH control)[1]

| | Amount of Additive, g./dl. | pH | Values After 60 Hours at 150° F. | | | |
|---|---|---|---|---|---|---|
| | | | 600 R.P.M. Stormer Viscosity, cps. | Ini. Gel, g. | 10' Gel, g. | 30' Cor. Water Loss, cc. |
| 5% Zeogel in saturated salt water | None | 8.1 | 5.5 | 9 | 14 | 140 |
| Solvent Extracted Linseed Hulls (Ground). | 1 | 7.4 | 25 | 24 | 29 | 50.5 |
| | 2 | 6.7 | 28 | 24 | 29 | 15.4 |
| | 4 | 5.8 | 44 | 34 | 39 | 6.4 |
| | 6 | 5.7 | 205 | 39 | 54 | 4.5 |

[1] Base mud—5 grams Zeogel, 95 cc. water plus enough NaCl to saturate. Zeogel s a fuller's earth of the Georgia-Florida type.

TABLE IV

Additives in fresh water Ada mud (no pH control)[1]

| | Amount of Additive, g./dl. | pH | Values After 50 Hours at 150° F. | | | |
|---|---|---|---|---|---|---|
| | | | 600 R.P.H. Stormer Viscosity, cps. | Ini. Gel, g. | 10' Gel, g. | 30' Cor. Water Loss, cc. |
| 33% Ada Clay in Distilled Water | None | 8.2 | 8 | 21 | 29 | 35.5 |
| Solvent Extracted Linseed Hulls (Ground). | 1 | 8.2 | 37 | 54 | 84 | 16.6 |
| | 2 | 8.15 | 57 | 69 | 114 | 8.8 |
| | 4 | 7.0 | jelly | jelly | jelly | 7.1 |
| | 6 | 6.6 | jelly | jelly | jelly | 4.1 |

[1] Ada clay is a well-known clay, mined in Oklahoma.

TABLE V

Additives in salt water Zeogel mud (pH controlled at 8.5, 10.5 and 12.5)

| Additive Added, 60 5 g./dl. Zeogel in Saturated Salt Water. | Ini. NaOH Added, Lb./Bbl. | Amt. of Additive, Lb./Bbl. | NaOH to Restore pH, Lb./Bbl. | pH | NaOH to Restore pH, Lb./Bbl. | After Heating 87 Hours at 150° F. | | | | |
|---|---|---|---|---|---|---|---|---|---|---|
| | | | | | | pH | Visc., cps. | Ini. Gel, g. | 10' Gel, g. | 30' Cor. Water Loss, cc. |
| Solvent Extracted Linseed Hulls at pH 8.5 | .013 | 1 | .021 | 8.7 | .021 | 8.6 | 26 | 19 | 24 | 33.8 |
| | .013 | 2 | .032 | 8.5 | .032 | 8.4 | 41 | 19 | 24 | 15.2 |
| | .013 | 4 | .095 | 8.4 | .116 | 8.6 | 82 | 20 | 34 | 6.9 |
| | .013 | 6 | .21 | 8.9 | .14 | 8.5 | 176 | 24 | 59 | 4.5 |
| At pH 10.5 | .17 | 2 | .12 | 10.5 | .17 | 10.4 | 53.5 | 34 | 34 | 15.9 |
| | .17 | 4 | .25 | 10.5 | .32 | 10.5 | 92.5 | 24 | 34 | 6.4 |
| | .17 | 6 | .38 | 10.4 | .48 | 10.6 | 245 | 50 | 75 | 4.1 |
| | .17 | 8 | .53 | 10.5 | .61 | 10.5 | pl. | 60 | 140 | 3.4 |
| At pH 12.5 | 3.15 | 2 | 0 | 12.5 | 1.02 | 12.4 | 58 | 19 | 54 | 19.3 |
| | 3.15 | 4 | 0 | 12.5 | 2.10 | 12.4 | 99 | 9 | 24 | 6.8 |
| | 3.15 | 8 | .84 | 12.5 | 2.53 | 12.4 | pl. | 80 | 105 | 3.7 |
| | 3.15 | 12 | 1.02 | 12.4 | (1) | (1) | (1) | (1) | (1) | 2.7 |

[1] Almost solid.

TABLE VI

| Amt. Added, gms./dl. | Initial Data [1] | | | | | After 18 Hours Rolling At 150° F. | | | | |
|---|---|---|---|---|---|---|---|---|---|---|
| | Stormer | | | pH | 30' Corr. W. L., cc. | Stormer | | | pH | 30' Corr. W. L., cc. |
| | Visc., cps. | Gel 0', gms. | Gel 10', gms. | | | Visc., cps. | Gel 0', gms. | Gel 10', gms. | | |
| 1 | 112 | 105 | 120 | 8.85 | 9.6 | 61 | 40 | 70 | 8.25 | 10.4 |
| 2 | 270 | 220 | 230 | 8.50 | 7.6 | 147 | 80 | 102 | 7.90 | 7.8 |
| 3 | pl. | pl. | pl. | 8.20 | 6.8 | 255 | 120 | 120 | 7.70 | 6.4 |

[1] The drilling fluid was mud D of Table I.

TABLE VII

| Amt. Added, gms./dl. | Initial Data [1] | | | | | After 18 Hours Rolling At 150° F. | | | | |
|---|---|---|---|---|---|---|---|---|---|---|
| | Stormer | | | pH | 30' Corr. W. L., cc. | Stormer | | | pH | 30' Corr. W. L., cc. |
| | Visc., cps. | Gel 0', gms. | Gel 10', gms. | | | Visc., cps. | Gel 0', gms. | Gel 10', gms. | | |
| 1 | 59 | 45 | 55 | 12.05 | 8.4 | 28 | 10 | 17 | 11.20 | 7.8 |
| 2 | 165 | 110 | 110 | 11.85 | 7.6 | 70 | 25 | 37 | 10.00 | 7.4 |
| 3 | 295 | 190 | 190 | 11.45 | 6.6 | 155 | 60 | 75 | 9.30 | 6.4 |

[1] The drilling fluid was mud E of Table I.

It will be seen that the above invention accomplishes its objects, previously stated. In the actual employment of the linseed hulls, they will be incorporated in the mud fluid base, or added to the drilling fluids, in the amounts required and in order to secure the desired results. One skilled in this art will understand, from the above disclosure, what amounts to add in order to meet particular conditions, and particularly in order to improve the water loss substantially. As will be seen from the above, the amount added will be in the nature of a small percentage, as distinguished from the additions of substantial percentages, as in the case of clays, and even of bentonite and fuller's earth.

The invention having been thus described, what is claimed is:

1. In the art of drilling wells by the employment of an aqueous clay-laden well-drilling fluid which is subject to additions thereto of formation solids, fluid and salts during the course of drilling, the process comprising, pumping the drilling fluid into the bore-hole and back to the surface and adding to such a fluid during the course of drilling finely divided linseed hulls in amounts sufficient to deposit the same on the wall of the bore-hole so as to maintain a low water loss of at most 10 c. c. A. P. I.

2. In the art of drilling wells by the employment of an aqueous clay-laden well-drilling fluid which is subject to additions thereto of formation solids, fluid and salts during the course of drilling, the process comprising, pumping the drilling fluid into the bore-hole and back to the surface and adding to such a fluid during the course of drilling finely divided oil-extracted linseed hulls in amounts sufficient to deposit the same on the wall of the bore hole so as to maintain a low water loss of at most 10 c. c. A. P. I.

3. An aqueous clay-laden well-drilling fluid, containing a small but sufficient percentage of finely divided linseed hulls to attain a low water-loss at a suitable drilling viscosity.

4. An aqueous clay-laden well-drilling fluid, containing a small but sufficient percentage of finely divided oil-extracted linseed hulls to attain a low water-loss at a suitable drilling viscosity.

5. A well-drilling fluid base comprising, a drilling clay and a small but sufficient percentage of finely divided linseed hulls to attain a low water-loss at a suitable drilling viscosity.

6. A well-drilling fluid base comprising, a drilling clay and a small percentage of finely divided oil-extracted linseed hulls.

7. A well-drilling fluid base comprising, a bentonite and a small but sufficient percentage of finely divided linseed hulls to attain a low water-loss at a suitable drilling viscosity.

8. A well-drilling fluid base comprising, a fuller's earth of the Georgia-Florida type and a small but sufficient percentage of finely divided linseed hulls to attain a low water-loss at a suitable drilling viscosity.

References Cited in the file of this patent

UNITED STATES PATENTS

| | | |
|---|---|---|
| 275,642 | Gordon | Apr. 10, 1883 |
| 675,423 | Stanley | June 4, 1901 |
| 683,787 | Newsome | Oct. 1, 1901 |
| 734,239 | Pratt | July 21, 1903 |
| 2,271,696 | Jones | Feb. 3, 1942 |
| 2,464,434 | Foster | Dec. 5, 1944 |
| 2,399,986 | Chapman | May 7, 1946 |

OTHER REFERENCES

Wallace: Drilling mud control in the Gulf Coast area, article in The Petroleum Engineer, January, 1946, pages 196, 198, 200, and 202.